United States Patent
Murphy et al.

(12) 
(10) Patent No.: US 6,282,192 B1
(45) Date of Patent: Aug. 28, 2001

(54) PSTN FALLBACK USING DIAL ON DEMAND ROUTING SCHEME

(75) Inventors: James Murphy, San Ramon; Ilya Umansky, San Jose, both of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/568,491

(22) Filed: May 9, 2000

Related U.S. Application Data

(63) Continuation-in-part of application No. 09/492,423, filed on Jan. 27, 2000.

(51) Int. Cl.⁷ ................................................ H04L 12/66
(52) U.S. Cl. ...................... 370/352; 370/435; 370/238
(58) Field of Search .............................. 370/352, 356, 370/354, 355, 401, 238, 465, 435

(56) References Cited

U.S. PATENT DOCUMENTS

| | | | |
|---|---|---|---|
| 5,953,312 | * | 9/1999 | Crawley et al. ............... 370/218 |
| 6,064,653 | * | 5/2000 | Farris ............................ 370/237 |
| 6,078,582 | * | 6/2000 | Curry et al. ................... 370/356 |

* cited by examiner

*Primary Examiner*—Chau Nguyen
*Assistant Examiner*—D. Trinh
(74) *Attorney, Agent, or Firm*—Marger Johnson & McCollom, P.C.

(57) ABSTRACT

A call fallback scheme is provided in a packet switched network. After receiving incoming calls, a Voice over IP (VoIP) link is established over a packet switched network with a destination endpoint. VoIP packets are generated from the incoming calls and sent over the VoIP link to the destination endpoint. When a low quality of service condition is detected on the VoIP link with the destination endpoint, a fallback call is established with the destination endpoint over a circuit switched network. The VoIP packets for the incoming calls are redirected from the VoIP link to the circuit switched data link. As opposed to simply hairpinning a TDM voice call back over the PSTN network 102, the same VoIP packets for the incoming calls originally destine for the destination endpoint over the packet switched network are rerouted through the fallback call. This simplifies synchronization with VoIP packets sent over the VoIP network. Because VoIP packets for more than one call can be sent over the fallback call, the cost of maintaining the fallback call is also substantially reduced.

27 Claims, 16 Drawing Sheets

PSTN FALLBACK USING DIAL ON DEMAND ROUTING SCHEME

This application is a continuation in part of U.S. patent application Ser. No. 09/492,423 filed Jan. 27, 2000 entitled: VOICE OVER INTERNET PROTOCOL CALL FALLBACK FOR QUALITY OF SERVICE DEGRADATION.

BACKGROUND OF THE INVENTION

This invention relates to Voice over Internet Protocol (VoIP) calls and more particularly to a Dial On Demand Routing (DDR) scheme used when quality of service degrades on the VoIP calls.

Voice signals are transmitted over a packet network by first formatting the voice signal data stream into multiple discrete packets. In a Voice Over Internet Protocol call, an originating voice gateway quantizes an input audio stream into packets that are placed onto a packet network and routed to a destination voice gateway. The destination voice gateway decodes the packets back into a continuous digital audio stream that resembles the input audio stream. A coded uses a compression/decompression algorithm on the quantized digital audio stream to reduce the communication bandwidth required for transmitting the audio packets over the network.

The Quality of Service (QoS) of VoIP calls can degrade due to congestion on the packet network or failure of network processing nodes in the packet network. Quality of service can include anything from call sound quality to the ability and responsiveness of the VoIP network in establishing new VoIP calls. IP network reliability has not been proven to be in the same class as a traditional switched Public Services Telephone Network (PSTN). For this reason, many customers request features that place VoIP calls back out on the traditional circuit switched network (hairpinning) when there is IP network congestion or an IP network failure.

Hairpinning calls over the PSTN has several problems. The first is that hairpinning is expensive. A primary reason customers are attracted to VoIP calls is the cost savings over the PSTN network. Rerouting calls over the PSTN network eliminates a portion of that savings. Hairpinning also increases the number of PSTN channels that must be maintained for each customer by a factor of two (in the case of complete VoIP network failure).

Hairpinning is only used at call setup time. Once a VoIP call has gone into the active state, there is no way to then reroute the call through the PSTN network and then synchronize the PSTN call with the VoIP call. Thus, if the QoS of the IP network degrades during a VoIP call, that entire VoIP call will exhibit the degraded quality. If a QoS problem is detected before a new VoIP call is established, that new call can be hairpinned over the PSTN network. However, the remainder of that call continues to be hairpinned over the PSTN network even if the QoS of IP network improves. Thus, the customer continues to be charged for the more expensive PSTN call even though the call could have been reestablished over the IP network with acceptable QoS.

Accordingly, a need remains for a more effective way to provide VoIP call fallback.

SUMMARY OF THE INVENTION

A call fallback scheme is provided in a packet switched network. After receiving incoming calls, a Voice over IP (VoIP) link is established over a packet switched network with a destination endpoint. VoIP packets are generated from the incoming calls and sent over the VoIP link to the destination endpoint. When a low quality of service condition is detected on the VoIP link with the destination endpoint, a fallback call is established with the destination endpoint over a circuit switched network. The VoIP packets for the incoming calls are redirected from the VoIP link to the circuit switched data link.

As opposed to simply hairpinning a TDM voice call back over the PSTN network 102, the same VoIP packets for the incoming calls originally destine for the destination endpoint via the packet switched network are rerouted as a digital bitstream through the fallback call. This simplifies synchronization with VoIP packets sent over VoIP link. Because VoIP packets for more than one call can be sent over the fallback call, the cost of maintaining the fallback call is also substantially reduced.

The foregoing and other objects, features and advantages of the invention will become more readily apparent from the following detailed description of a preferred embodiment of the invention which proceeds with reference to the accompanying drawings.

DETAILED DESCRIPTION

Figure 1:
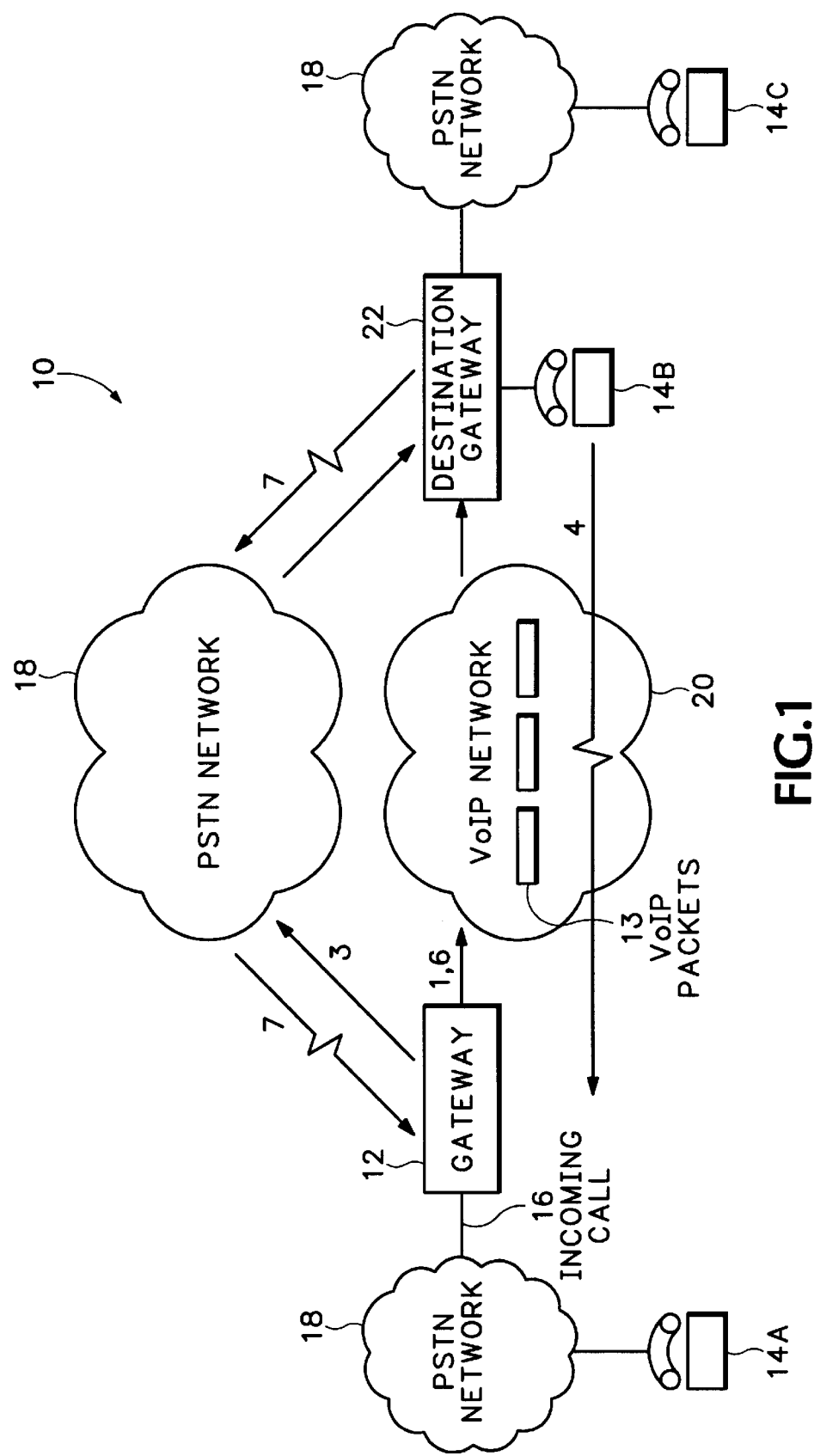
FIG. 1 is a schematic diagram of a communications network using call fallback according to one embodiment of the invention.

FIG. 1 shows a communication network 10 that includes a PSTN network 18 and a Voice over Internet Protocol (VoIP) network 20. The PSTN network 18 can include any combination of Integrated Services Digital Network (ISDN) subnetworks and Plain Old Telephone Service (POTS) subnetworks that carry analog and digital voice, video and data. The VoIP network 20 is an Internet Protocol (IP) packet switched network that transfers packets containing voice, video or other data between different IP addresses. An originating gateway 12 receives incoming calls 16 from different endpoints such as a telephone 14A. The incoming calls 16 can be analog calls sent over DS0 channels, ISDN calls or any other call sent over a communications network.

Pursuant to receiving the incoming call 16, the originating gateway 12 normally establishes a VoIP call 1 with a destination gateway 22 associated with a destination phone number associated the incoming call 16. The originating gateway 12 converts the incoming call 16 into VoIP packets 13 and sends the VoIP packets 13 over the VoIP network 20 to the destination gateway 22. The destination gateway 22 receives and then converts the VoIP packets 13 back to audio signals. The audio signals are then either output to another endpoint, such as phone 14B, or sent over another portion of the PSTN network 18 where an endpoint associated with the destination phone number is located, such as phone 14C.

During VoIP call 1, either the originating gateway 12 or the destination gateway 22 detects unacceptable degradation in Quality of Service (QoS) for the in-progress VoIP call 1. Based on the detected QoS, a PSTN fallback call 3 is triggered. The PSTN fallback call 3 is set up through the PSTN network 18. After the fallback call 3 is set up, audio signals from the incoming call 16 are cross connected over the PSTN call 3 to the destination gateway 22. When the destination gateway 22 starts receiving the audio signals over the fallback call 3, the destination gateway 22 terminates the VoIP call 1 as represented by arrow 4. If QoS improves in the VoIP network 20 during the fallback call 3, a new VoIP call 6 is reestablished through the VoIP network 20. After the destination gateway 22 starts receiving packets again over the new VoIP call 6, the destination gateway 22 drops the PSTN call 3 as represented by arrow 7.

Figure 2:
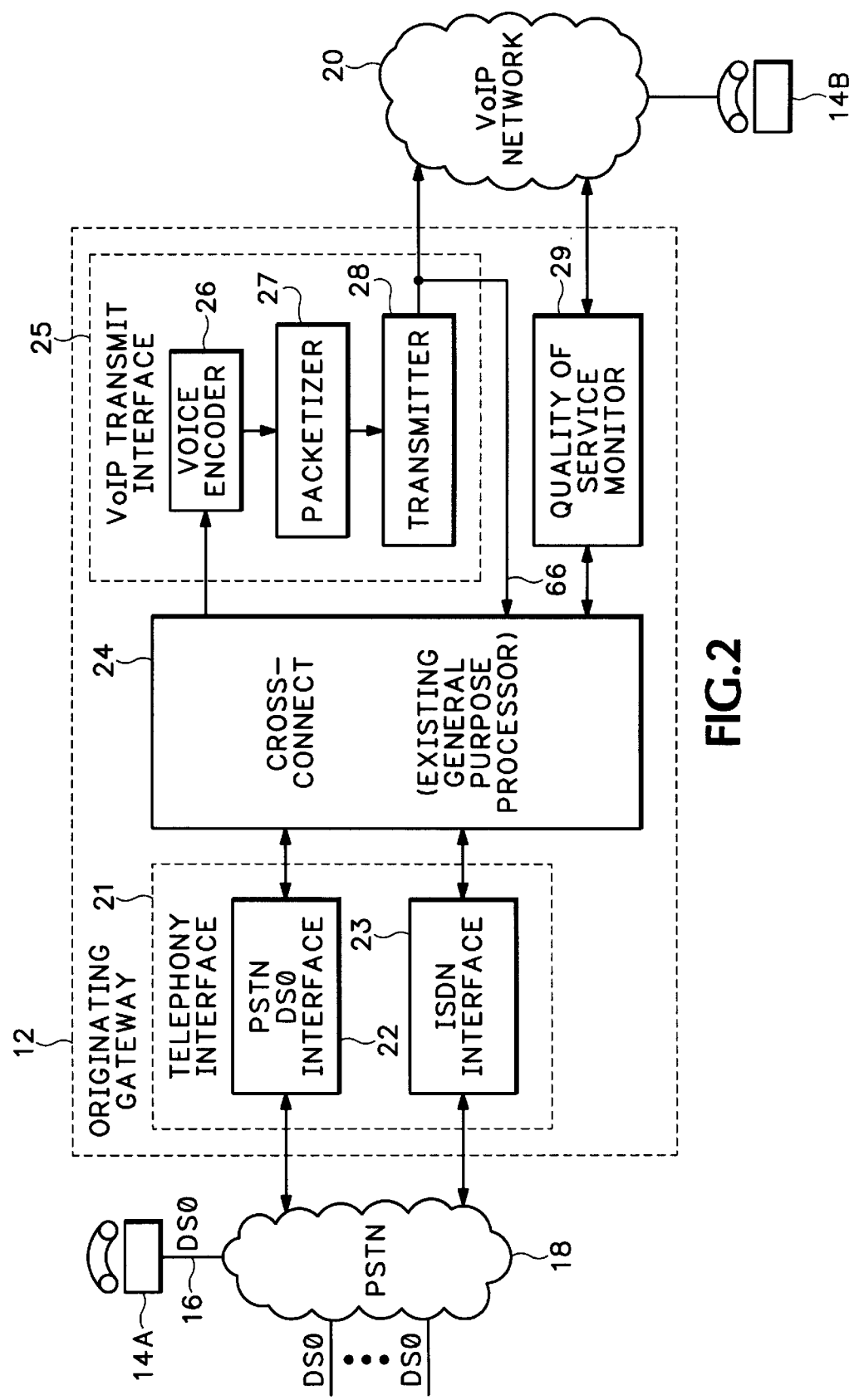
FIG. 2 is a detailed diagram of an originating gateway according to the invention as shown in FIG. 1.

The fallback scheme described above provides seamless PSTN fallback, without interrupting a call in-progress. This fallback scheme also provides uninterrupted switching of an ongoing fallback call on the PSTN network 18 back to the VoIP network 20 when the QoS improves for the VoIP network. Switching calls between the VoIP network 20 and the PSTN network 18 is performed as many times during the call as needed to minimize call cost while maintaining an acceptable level of call quality of service. FIG. 2 is a detailed diagram of the originating gateway 12 shown in FIG. 1. A telephony interface 21 includes multiple PSTN DS0 interfaces 22 and/or multiple ISDN interfaces 23. Each PSTN DS0 interface 22 receives and transmits calls over DS0 channels and each ISDN interface 23 receives and transmits Integrated Services Digital Network (ISDN) calls. A VoIP interface 25 includes a voice encoder 26, a packetizer 27, and a transmitter 28. The voice encoder 26 implements the compression half of a coded. Packetizer 27 accepts compressed audio data from encoder 26 and formats the data into VoIP packets for transmission over the VoIP network 20. Transmitter 28 places the VoIP packets from packetizer 27 onto VoIP network 20.

Of particular importance in the originating gateway 12 is a fallback cross connect 24 that cross connects Time Division Multiplexed audio signals from the incoming calls 16 with either the VoIP interface 25 or the telephony interface 21. The cross connect 24 is typically an existing general purpose processor in the gateway that is coded with additional software that provides the cross connect logic described below. Other implementations of the cross connect 24 are also possible using any logic device, such with a programmable logic device, etc.

The cross connect 24 is loaded with the computer program (software) that performs the fallback cross connect according to the invention. The computer program is stored in a computer readable media, such as a Dynamic Random Access Memory (DRAM), Read Only Memory (ROM), Electrically Erasable Programmable Read Only Memory (EEPROM), etc.

A quality of service monitor 29 monitors the QoS of the VoIP network 20. The quality of service monitor 29 is typically VoIP monitoring software that already exists and is provided in the operating system of the gateways.

Figure 3:
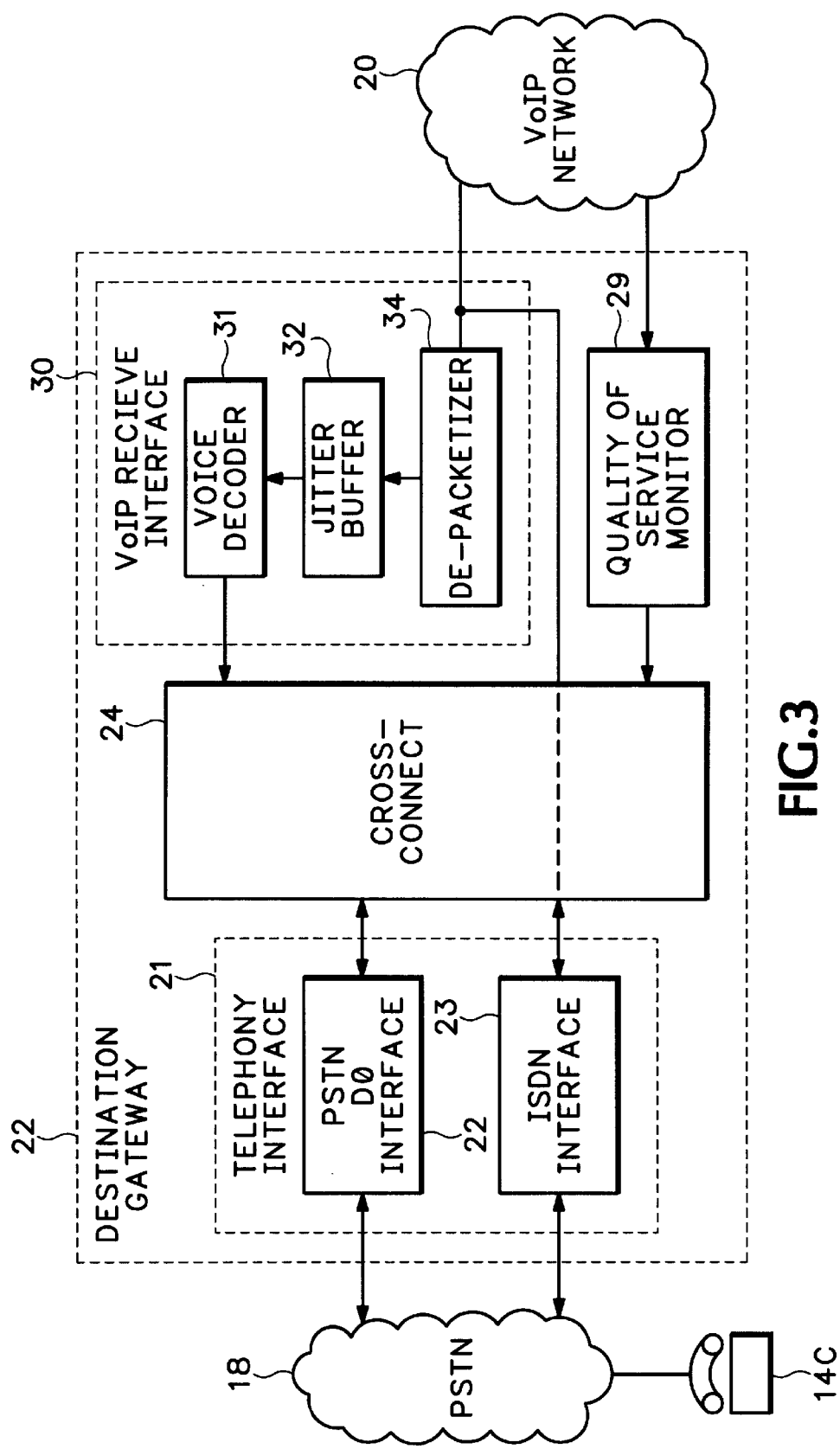
FIG. 3 is a detailed diagram of a destination gateway according to the invention as shown in FIG. 1.

Referring to FIG. 3, the destination gateway 22 shown in FIG. 1 includes the same telephony interface 21 that includes multiple PSTN interfaces 22 and multiple ISDN interfaces 24 as described in the originating gateway 12. The fallback cross connect 24 and the quality of service monitor 29 operate in substantially the same manner as the cross connect 24 and monitor 29 described in FIG. 2. Particular operations that the cross connect 24 performs in the destination gateway 22 are described below in FIG. 7. A VoIP receive interface 30 couples the VoIP network 20 to the cross connect 24.

The VoIP receive interface 30 reverses the process of the VoIP transmit interface 25 shown in FIG. 2. A depacketizer 34 accepts packets from VoIP network 20 and separates out audio frames. A jitter buffer 32 buffers the audio frames and outputs them to a voice decoder 31 in an orderly manner. The voice decoder 31 implements the decompression half of the coded employed by voice encoder 26 (FIG. 2). The decoded audio frames (TDM audio signals) are then output through the fallback cross connect 24 and the telephony interface 21 to PSTN network 18. The operations necessary to transmit and receive audio packets performed by the telephony interface 21, VoIP transmit interface 25 (FIG. 2), and VoIP receive interface 30 are well known and, therefore, not described in further detail.

It should be understood that the circuitry and functions described in the originating gateway 12 and the destination gateway 22 typically exist in every gateway that provides call fallback according to the invention. However, for clarity, only operations particular to originating a fallback call are described for originating gateway 12 and only operations particular to receiving a fallback call are described for destination gateway 22.

Figure 4A:
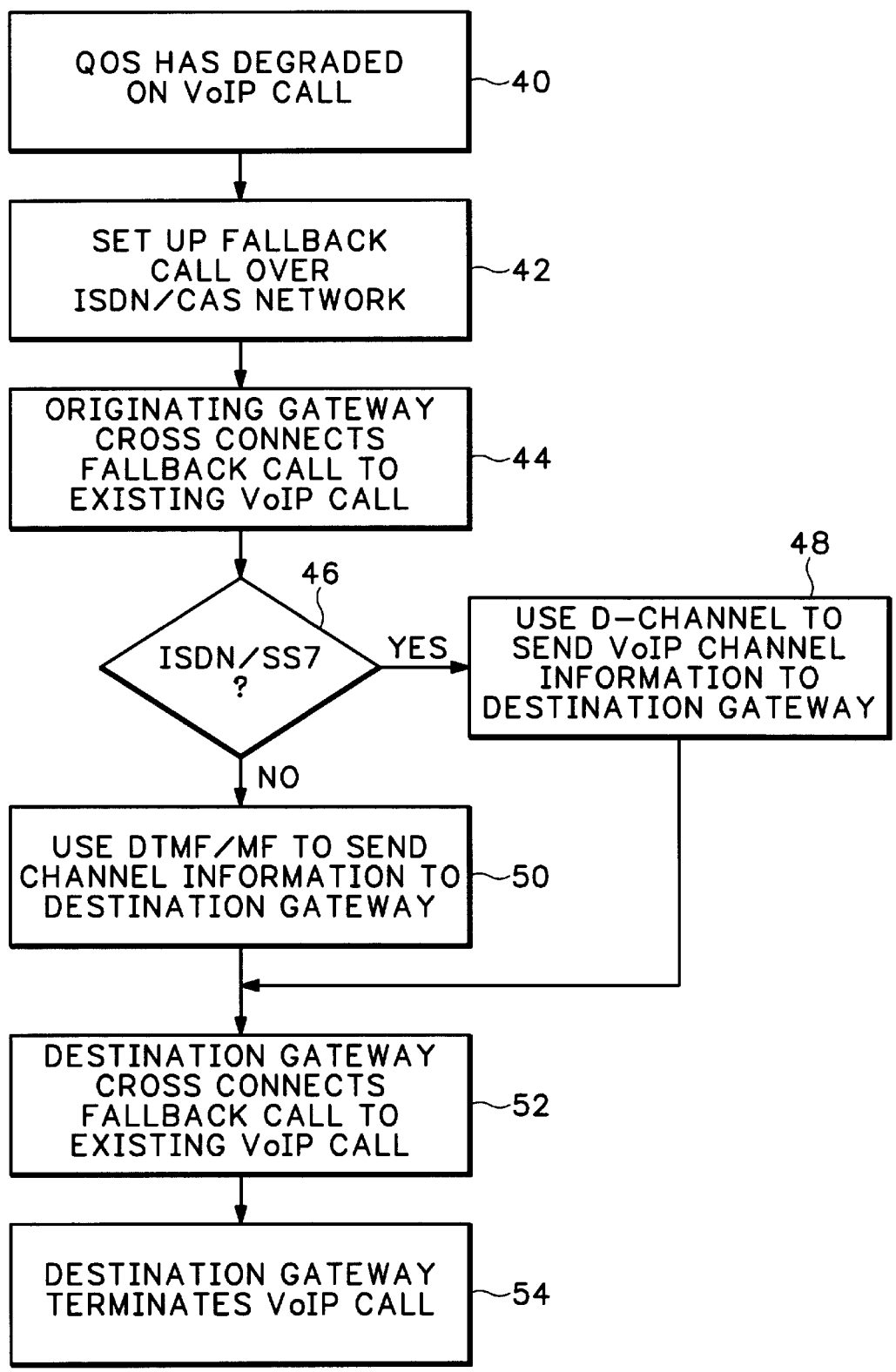
FIGS. 4A–4B are flow diagrams explaining how the call fallback scheme of the invention operates in the originating gateway and destination gateway shown in FIGS. 2 and 3.

FIG. 4A is a flow chart describing in further detail how the originating gateway 12 and the destination gateway 22 in FIGS. 2 and 3, respectfully, perform seamless PSTN fallback, without interrupting an in-progress VoIP call. The cross connect 24 in block 40 determines from the quality of service monitor 29 (FIGS. 2 and 3) that QoS has degraded for a current VoIP call.

The cross connect 24 sets up a PSTN fallback call through the telephony interface 21 in block 42. If the fallback call is over the ISDN interface 23 (FIG. 2), ISDN signaling is used to set up the fallback call. If the fallback call is made over a DS0 channel, CAS signaling is used to set up the fallback call. CAS is a form of signaling used on a T1 line. With CAS, a signaling element is dedicated to each channel in a T1 frame. The T1 CAS feature enables call signaling (such as on-hook and off-hook) through each channelized T1 line.

In block 44, the cross connect 24 in the originating gateway 12 cross connects the incoming call to the existing VoIP call to the PSTN fallback call. This is described in further detail below in FIGS. 5–9. If ISDN or SS7 signaling is available for the PSTN fallback call in decision block 46, then a D-channel in the fallback call connection is used in block 48 to send VoIP call and fallback call information to the destination gateway 22. Common Channel Signaling System No. 7 (SS7) is a global standard for telecommunications by which network elements in the PSTN network exchanges information to effect call setup, routing and control. If the fallback call does not have ISDN/SS7 signaling available, then Dual Tone Multi-Frequency (DTMF/MF) signals are sent to the destination gateway 22 in block 50 to identify the fallback call with the VoIP call.

Alternatively, in case of ISDN if voice is transmitted as packets over the fallback, no signaling is needed to relate fallback and non-fallback channels. Each packet carries the channel information in its packet header. More than one call can be routed over a single ISDN fallback channel depending on the voice coded used. The destination gateway 22 cross connects the fallback call to the existing VoIP call in block 52. The destination gateway 22 then terminates the VoIP call in block 54.

Figure 4B:
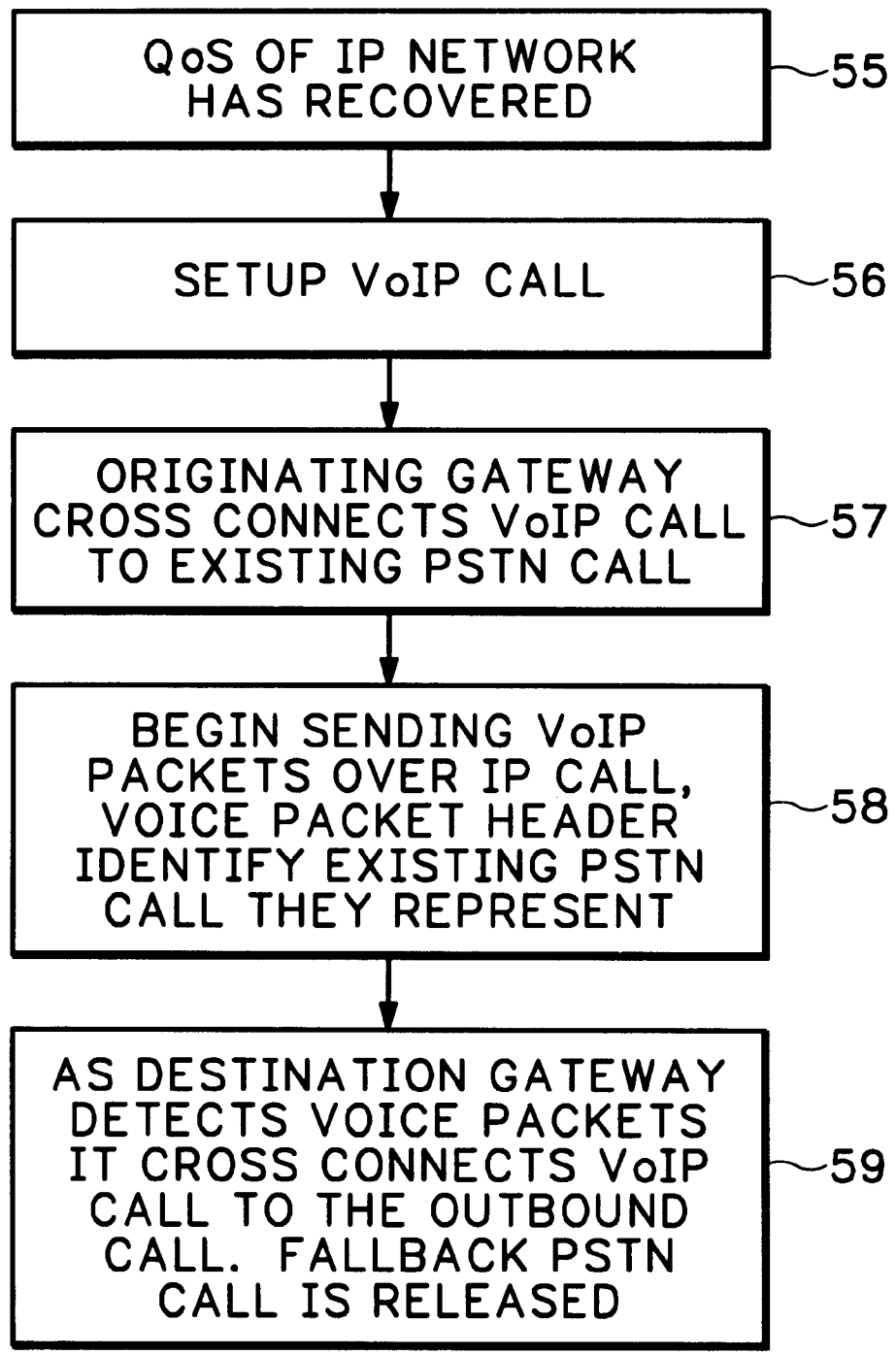

FIG. 4B is a flow diagram that shows how the invention reverts back to a VoIP call once the VoIP network 20 has recovered. In block 55 the originating or destination gateway determines that the QoS for the VoIP network 20 has recovered. In block 56 a new VoIP call is set up between the originating gateway 12 and the destination gateway 22. The originating gateway 12 in block 57 cross connects the VoIP call to the existing PSTN call. In block 58, the originating gateway 12 begins sending VoIP packets for the incoming call through the new VoIP call. The headers in the VoIP packets identify the existing PSTN call that the VoIP packets represent. When the destination gateway detects the voice packets, the VoIP call is cross connected to an outbound call in block 59. The PSTN call is then released.

Figure 5:
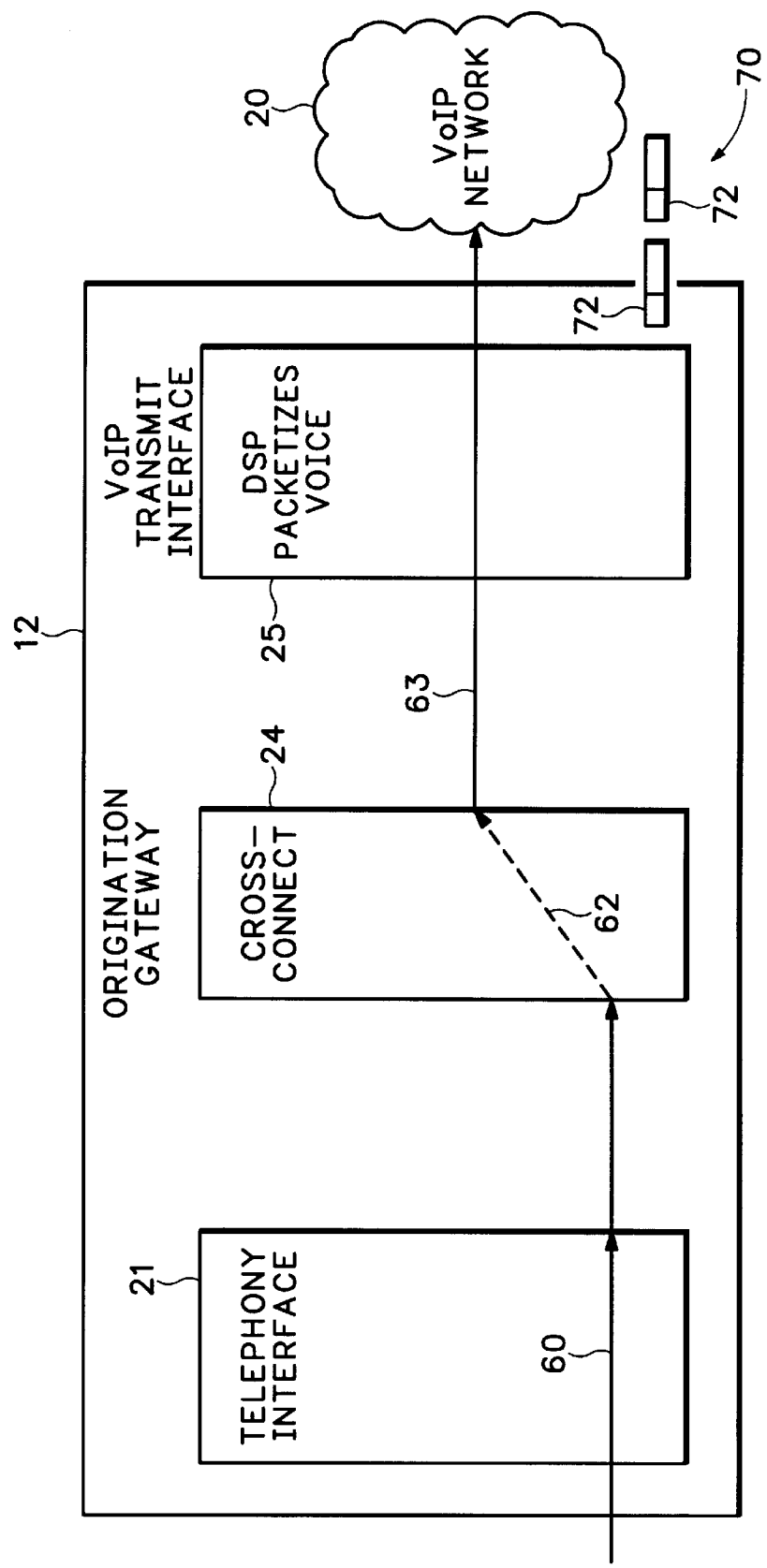
FIGS. 5–9 show step-by-step how the gateways in FIGS. 2 and 3 perform call fallback according to the invention.

FIGS. 5–9 show the different cross connections made by the cross connect 24 during a fallback session. Referring first to FIG. 5, when the originating gateway 12 receives an incoming call 60. The cross connect 24 provides a cross connection 62 that cross connects the PSTN voice channel for the incoming call 60 to a DSP channel in the VoIP transmit interface 25 for a VoIP call 63. The voice signals from the incoming call 60 are packetized by the VoIP interface 25 and sent out over the VoIP network 20 as VoIP packets 70. The VoIP packets 70 include headers 74 that provide VoIP call information including call identification, call destination, packet sequence, etc.

Figure 6:
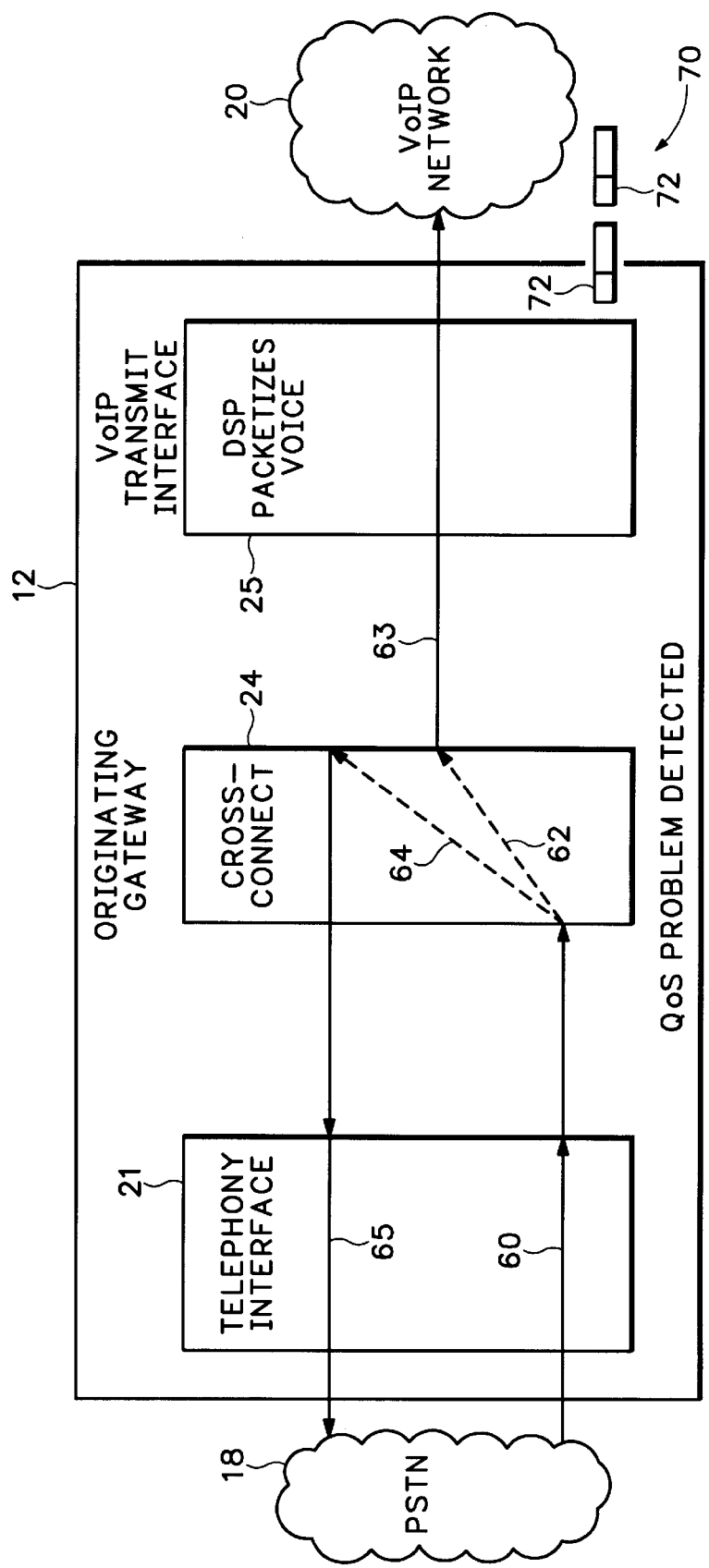

Referring to FIG. 6, if QoS degradation is detected, an outgoing fallback call 65 is made to the same destination gateway 22 over a PSTN channel. Once the originating gateway 12 receives a call answer from the destination gateway 22, the cross connect 24 cross connects the DS0 channel for the incoming call 60 to the outgoing PSTN channel for the outgoing fallback call 65. The incoming call 60 then continues over the PSTN fallback call 65.

The incoming call 60 is output for a time by cross connections 62 and 64 to both the outgoing channel of the VoIP call 63 and the outgoing channel for the PSTN fallback call 65. During this time, destination gateway 22 receives voice signals for the same incoming call 60 from both the VoIP call 63 and the PSTN fallback call 65. The destination gateway 22 is notified that the VoIP call 63 and the PSTN call 65 carry the same voice signals by sending tones over the fallback call 65.

Figure 7:
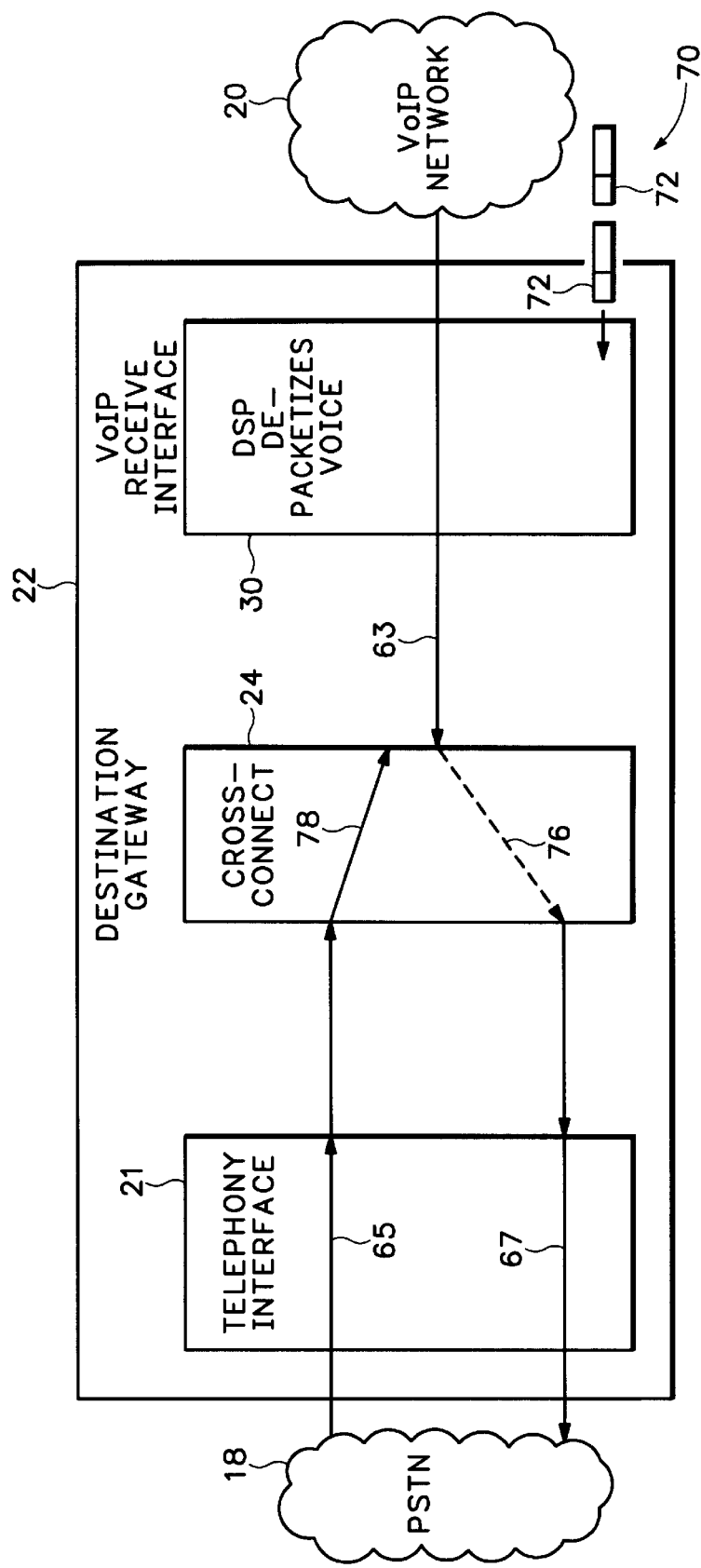

Referring to FIG. 7, the telephony interface 21 in the destination gateway 22 receives the PSTN fallback call 65. At the same time, the VoIP receive interface 30 continues to receive and decode VoIP packets 70 from the VoIP call 63. TDM voice signals from the decoded VoIP packets 70 are sent by cross connection 76 to an off-ramp DS0 channel on outgoing call 67.

As described above in FIG. 1, the outgoing call 67 may be sent directly to a destination endpoint or sent over another portion of the PSTN network before reaching the destination endpoint. The destination gateway 22 finishes playing whatever audio packets 70 remain in the jitter buffer 32 (FIG. 3). Voice Activation Detection (VAD) can also be used for resynchronization as described below in FIG. 19. The cross connect 24 then uses cross connections 78 and 76 to cross connect the incoming PSTN channel for PSTN fallback call 65 to the outgoing PSTN channel of outgoing call 67. The cross connect 24 then drops the VoIP call 63 and signals to the originating gateway 12 over the fallback call 65 that the VoIP call 63 is closed.

The destination gateway 22 can also detect a QoS degradation. destination gateway 22 then acts in a manner similar to the originating gateway 12. The destination gateway 22 establishes a PSTN fallback call to the originating gateway and signals what VoIP session the PSTN fallback call concerns. This is not necessary if voice is sent in packets over an ISDN connection since the packets in the ISDN call will identify the VoIP call. The originating gateway 12 then routes calls over the established PSTN fallback call.

Figure 8:
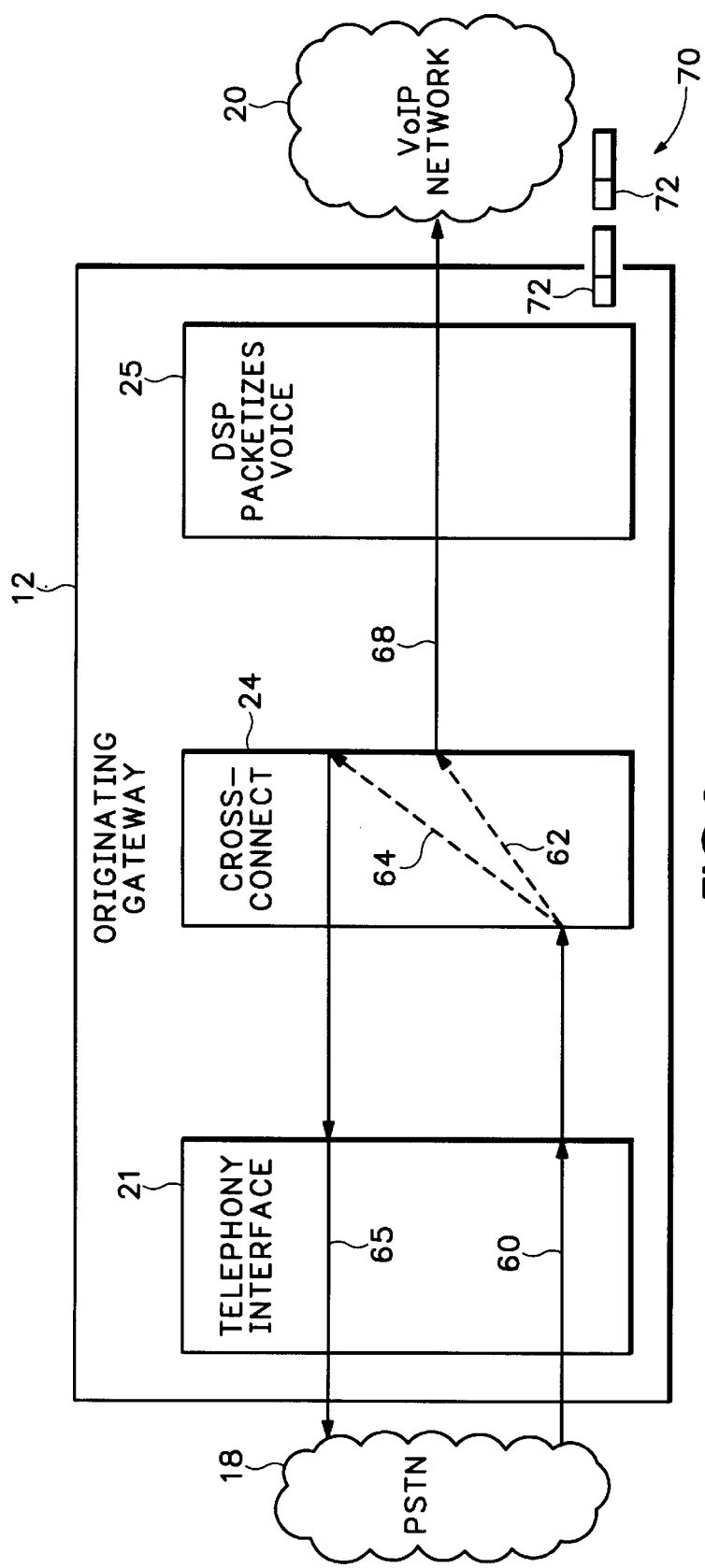

Referring to FIG. 8, once QoS conditions on the VoIP network 20 improve, call(s) carried by the PSTN fallback call 65 are seamlessly rerouted back over a new VoIP call 68 and the PSTN fallback call 65 is torn down. The cross connect 24 establishes a new VoIP call 68 to the destination gateway 22 and uses connection 62 to cross connect audio signals from the incoming call 60 to the new VoIP call 68. The incoming call 60 is now cross connected to two output channels, the output channel for VoIP call 68 and the output channel for PSTN fallback call 65.

For some time, destination gateway 22 will receive the voice signals from the same incoming call 60 over both the PSTN call 65 and the new VoIP call 68. Destination gateway 22 is signaled in the headers 72 of the VoIP packets 70 that the VoIP call 68 and the fallback call 65 carry voice from the same incoming call 60. Once the destination gateway 22 starts receiving the voice packets 70, the PSTN fallback call 65 is disconnected by the destination gateway 22. From this point on, voice from the incoming PSTN call 60 is carried completely over the VoIP call 68.

For better synchronization of the voice streams when switching from/to PSTN and VoIP, a time stamp on the VoIP voice packets can be used. The time stamp can be compared to the real time to determine the best point in time to switch the voice stream. For example, when a fallback call is to be cross connected to the destination gateway output, the destination gateway can compare the time stamp in the VoIP packet with the actual time of day when the signals for the fallback are received. As soon as the destination receives and then outputs the packets for that identified time, the cross connects switches the fallback call to the output and the primary VoIP call is dropped. Alternatively, VAD can be used to synchronize the voice stream streams as described above.

In most cases it is not possible to hit a voice packet that exactly matches the actual time since there is always some packet delay in the VoIP network. So, the fallback is performed when the difference between the received time stamp and the time of day is at some minimal value. The cross connect 24 could also look ahead into the jitter buffer 32 and see at what packet time stamp converges best with the actual time.

Figure 9:
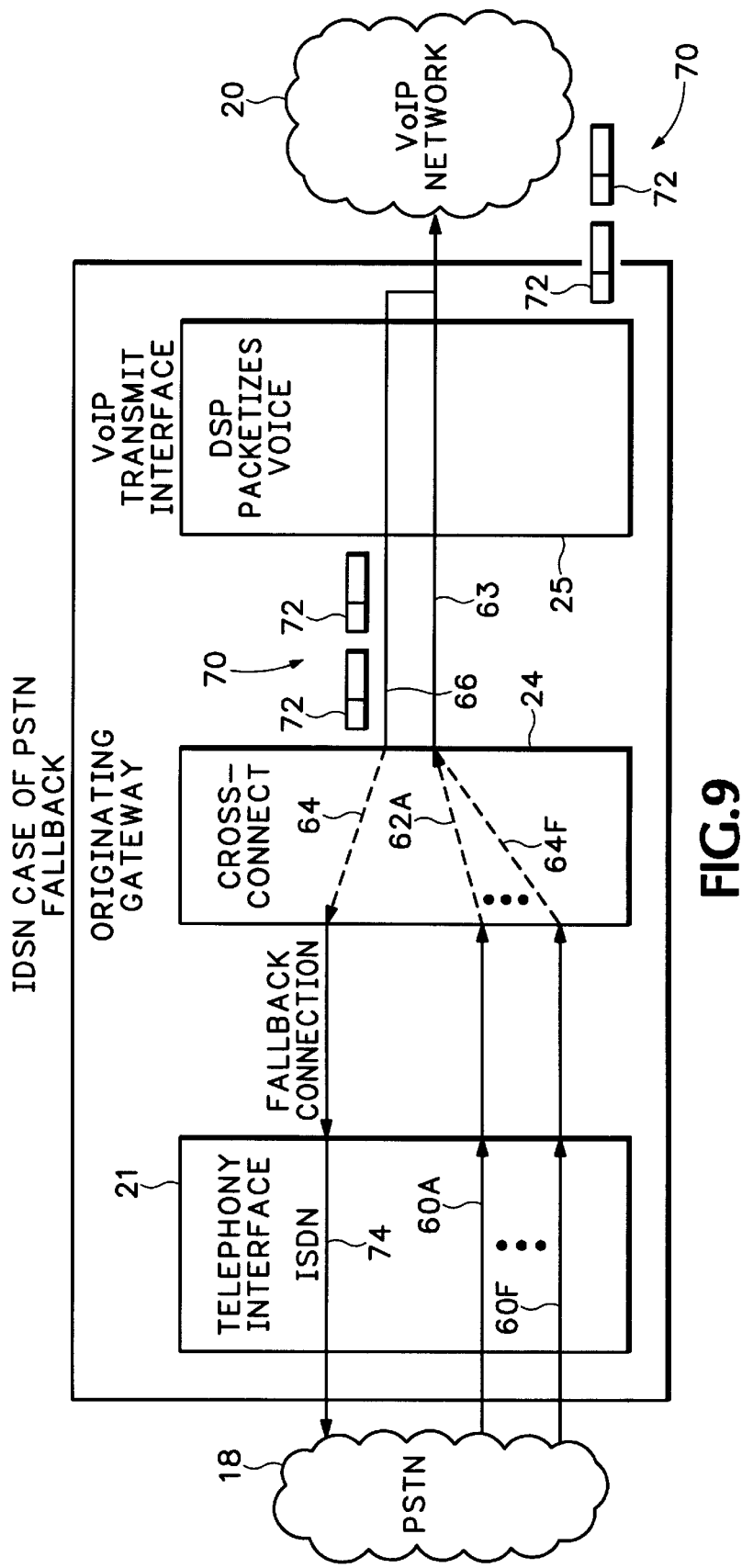

FIG. 9 shows another aspect of the invention. Instead of cross connecting the incoming call 60 from a DS0 channel to a fallback call 65 on an outgoing DS0 channel (FIG. 6), the incoming call 60 is cross connected to a fallback call 74 on an outgoing ISDN channel. With an ISDN fallback call 74, the cross connect 24 continues to route the incoming call 60 via connection 62 through the VoIP interface 25 and out the VoIP call 63. The VoIP interface 25 encodes the voice on the incoming call 60 into voice packets 70. However, the voice packets 70 are routed back through path 66 and connection 64 to the ISDN channel for ISDN fallback call 74. One channel on the ISDN fallback call 74 can carry packet traffic for multiple incoming DS0 calls 60A–60F (likely up to six, depending on the codec used). The headers 72 in VoIP packets 70 identify the VoIP packets with one of the incoming calls 60A–60F.

In the case of ISDN fallback, when one or more of the incoming calls 60A–60F are received, originating gateway 12 first checks to see if there is already an existing ISDN fallback call that is carrying other calls to the same destination gateway. If any incoming calls 60A–60F are targeted to the same destination gateway as an existing ISDN fallback call 74, and if bandwidth allows, ISDN call 74 is used to carry those other call(s) 60A–60F. Otherwise, a new fallback call is established to the destination gateway.

The invention contributes and simplifies new incoming call admission control. A new incoming call will not be accepted by the originating gateway 12 if there are already incoming calls in-progress that are using PSTN fallback to the same targeted destination gateway.

Measuring Quality of Service (QoS) of the VoIP network 20 for initiating call fallback can be determined in a variety of different ways. One QoS measurement is determined by the amount of time it takes audio packets to travel between the originating gateway 12 and the destination gateway 22. This end-to-end delay is calculated using existing packet based voice protocols, such as Real Time Protocol (RTP RFC 1889) and Real Time Control Protocol (RTCP). RTP provides end-to-end transport for applications of streaming or real-time data, such as audio or video. RTCP provides estimates of network performance.

RTP and RTCP also enable the destination gateway 22 to synchronize the packets received from the originating gateway 12 in the proper order so a user hears or sees the information correctly. Logical framing defines how the protocol "frames" or packages the audio or video data into bits (packets) for transport over a selected communications channel. Sequence numbering determines the order of data packets transported over a communications channel. RTCP also contains a system for determining round trip delay and periodically reporting that round trip delay back to the originating gateway 12. Any other dynamic measure of round trip delay, network congestion, network failures, etc. can similarly be used as a Quality of Service identifier to the gateways 12 and 22.

Dial on Demand Routing

Figure 10:
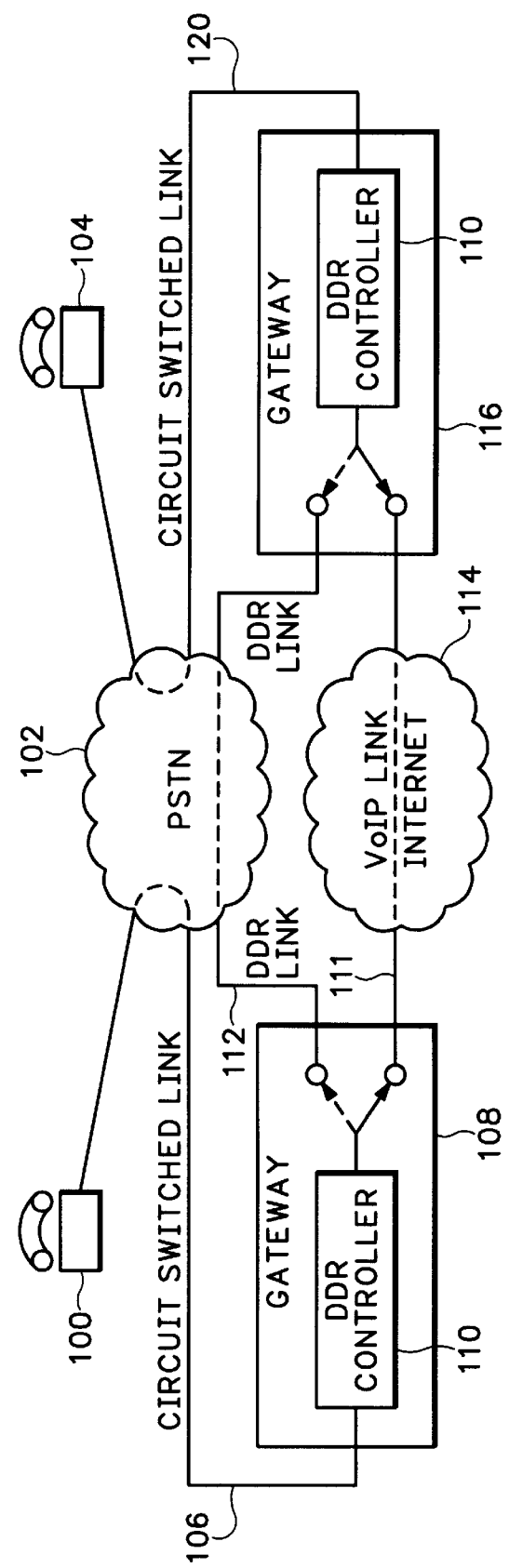
FIG. 10 is a diagram showing a Dial on Demand Routing Scheme (DDR) according to another aspect of the invention.

FIG. 10 shows a communications network that performs a Dial on Demand Routing scheme (DDR) according to another aspect of the invention. Multiple phones 100 and 104 are coupled to a PSTN 102. When calls are routed over the Internet Protocol (IP) network 114, a circuit switched TDM link 106 originating from the circuit switched PSTN network 102 is connected to a first gateway 108.

The incoming circuit switched call is routed over a VoIP link 111 to a second gateway 116. Another circuit switched TDM link 120 is established between the gateway 16 and telephone 104 over a portion of the circuit switched PSTN network 102. The VoIP packets transmitted over VoIP link 111 are converted back into TDM audio signals by gateway 116 and sent over the circuit switched link 120 to phone 104.

If a congestion problem somewhere in the IP network 114 reduces the QoS on the VoIP link 111, an alternative Dial on Demand Routing link 112 is initiated through the PSTN network 102. Congestion detection is defined as anything that reduces the quality of service of the voice call on the IP network. DDR controllers 110 in the gateways 108 and 116 reroute calls destine for the gateway 116 over the DDR link 112.

The DDR controllers 110 do not simply hairpin voice data from link 106 back over the PSTN network 102 as a voice call. Conversely, the DDR controllers 110 establish a data channel, (ISDN raw digital, voice modem, etc) over the PSTN 102. The DDR controllers 110 map IP addresses for packets destine for gateway 116 to a phone number. The DDR controllers 110 use the identified phone number to establish the DDR link 112. After the DDR link 112 is established, the bitstream comprising VoIP packets for the calls destine for gateway 116 are rerouted through DDR link 112.

Figure 11:
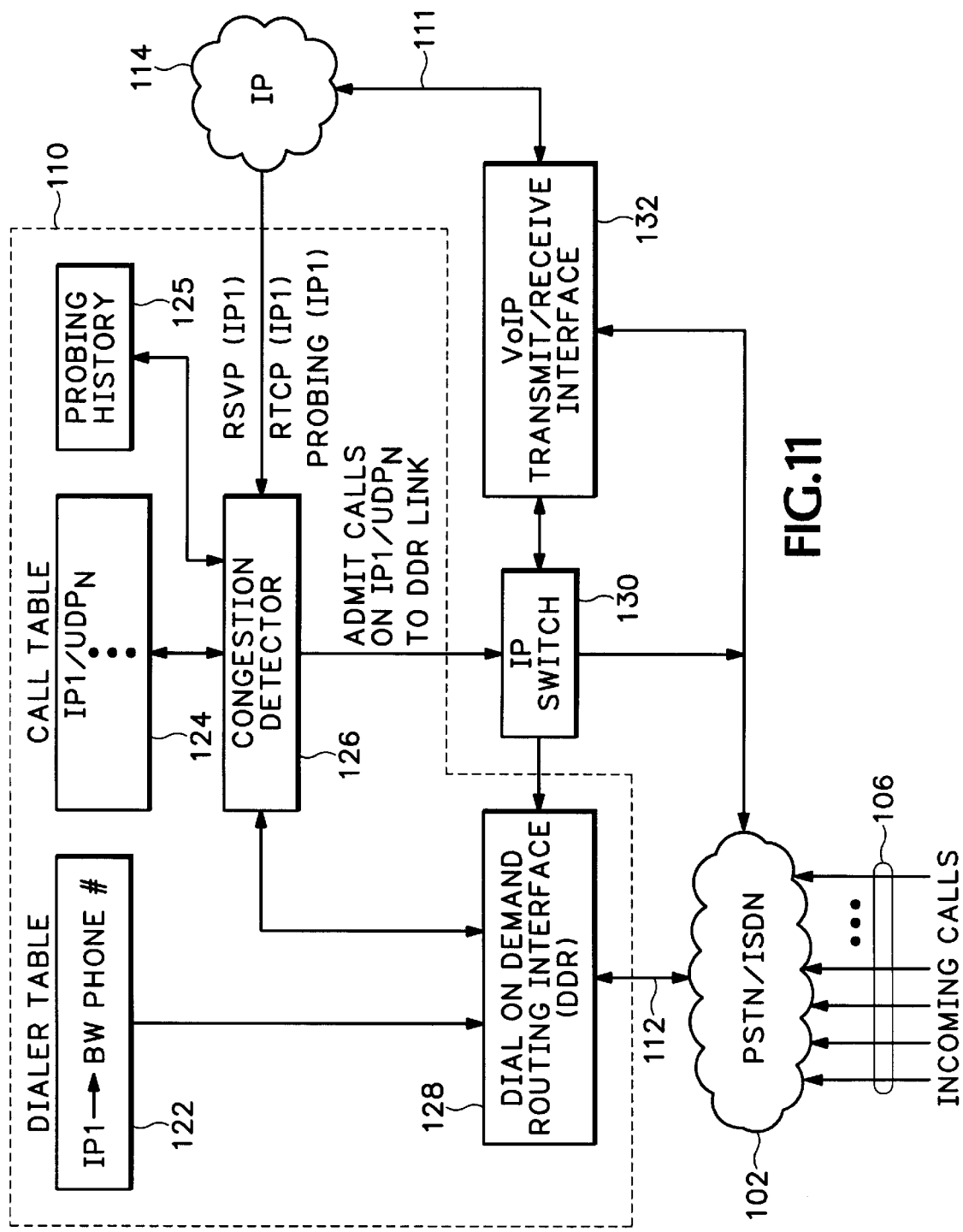
FIG. 11 is a detailed diagram of a DDR controller shown in FIG. 10.

FIG. 11 is a detailed diagram for one of the DDR controllers 110 shown in FIG. 10. Referring to FIGS. 10 and 11, a VoIP transmit and receive interface 132 is similar to interfaces 25 and 30 shown in FIGS. 2 and 3. The interface 132 converts between a packet switched VoIP packet format and TDM circuit switched signals.

A congestion detector 126 detects IP network congestion by monitoring VoIP packets for IP addresses that are associated with VoIP link 111. Network Failure or Congestion Detection is detected in different ways. Failure to connect a VoIP link during a call setup is identified by using the RSVP protocol. The congestion detector 126 can also observe RTCP reports for IP addresses to determine if there is excessive packet delay, packet loss, or packet jitter. The congestion detector 126 can also conduct a probing routine that maintains a history of the endpoints in communication with gateway 108. The congestion detector 126 periodically sends out probe packets to those endpoints, such as gateway 116. The probe packets are echoed back to the originating gateway 108.

Every incoming call to the gateway 108 is identified by an Internet Protocol Address and Universal Datagram Protocol Port (IP/UDP) pair. When a new incoming call comes into gateway 108, the congestion detector 126 first determines if there is any previous congestion associated with the IP destination address associated with the new incoming call. The congestion detector 126 references a probing history table 125 to determine if there is currently a congestion problem associated with that IP address endpoint.

Based on this address monitoring, congestion detector 126 determines if there may be a QoS problem transferring packets to that particular IP address location, such as address location IP1. The congestion detector 126 notifies a DDR interface 128 when there is an identified QoS problem at IP address IP1.

DDR interface 128 accesses a dialer table 122 and searches for a phone number associated with IP address IP1. The phone number associated with IP1 is used by DDR interface 128 to set up an ISDN data call through the PSTN 102. The phone number will access the same network processing device, in this case gateway 116, that serves as the termination point for VoIP link 111. The congestion detector 126 is notified by the DDR interface 128 when the new DDR connection 112 is established.

The congestion detector 126 directs an IP switch 130 in the gateway 108 to switch calls destine for the congested IP1 address to the DDR link 112. The IP switch 130 then reroutes any incoming calls 106 having the identified IPI/UDP address from the VoIP link 111 to the DDR link 112.

The congestion detector 126 references a call table 124 that tracks the number of calls to particular IP/UDP addresses and the number of those calls rerouted to DDR link 112. The congestion detector 126, according to available bandwidth, directs the IP switch 130 to reroute calls directed to a congested IP/UDP address to the DDR link 112. After a predetermined number of calls have been rerouted to the DDR link 112, the congestion detector 126 may direct the DDR interface 128 to establish a second DDR link as described below in FIG. 12.

MultiLink DDR

Figure 12:
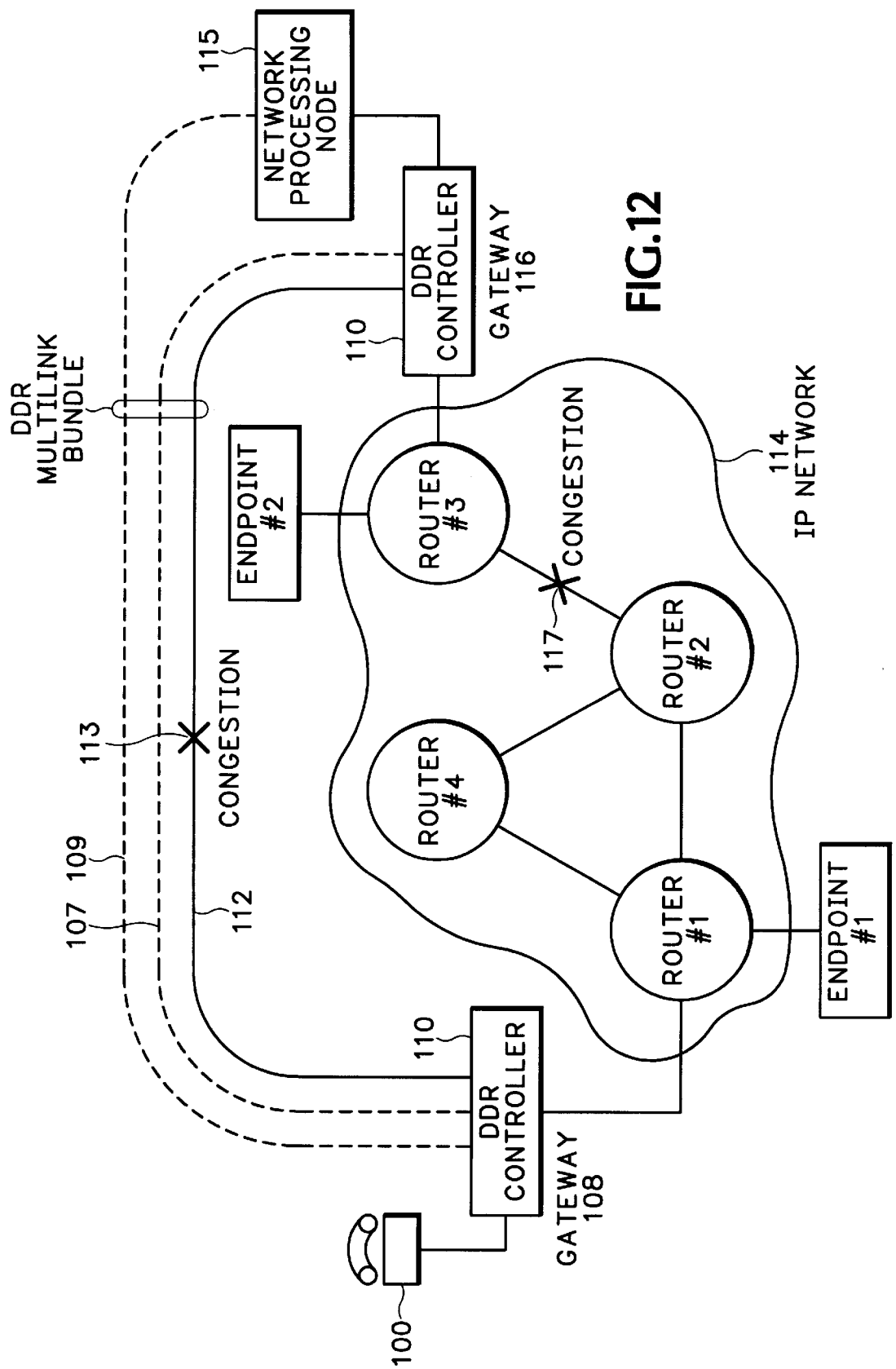
FIG. 12 is a diagram showing a multi-DDR link.

Referring to FIG. 12, the DDR controller 110 can also provide a multilink multichassis protocol. This means that a cluster of gateways can share and aggregate multiple DDR links in a multilink bundle. As additional calls are directed between gateway 108 and 116, and if the IP network continues to exhibit congestion, the bandwidth may be used up on a single DDR link 112. The DDR interface 108 will then establish one or more additional links 107 and 109 as needed to increase the overall DDR link bandwidth. The DDR link then comprises a multilink bundle 112, 107, 109.

One or more of the multiple DDR links 107, 109 or 112 can terminate on different network processing nodes. For example, DDR link 109 is shown terminating on a network processing node 115 and DDR links 107 and 112 are shown terminating on gateway 116. The multilink multichassis protocol is then used to forward DDR link 109 from network processing node 115 to gateway 116. A multilink multichassis protocol is described in U.S. patent application Ser. No. 08/846,788 entitled: Dynamic Bidding Protocol for Conducting Multilink Sessions Through Different Physical Termination Points, filed on Apr. 30, 1997 which is herein incorporated by reference.

The DDR controllers 110 will not route any best effort traffic and the route will not be advertised to the rest of the IP network 114. The only traffic transmitted on the DDR link 112 will be voice packets having the same IP address as the termination endpoint identified as having QoS problems. In this example, a destination IP address directed to gateway 116 are redirected over DDR link 112. Since the DDR controllers 110 are created on the gateways 108 and 116, voice traffic is very easy to identify via internal mechanisms.

The new DDR link 112 is not advertised to best effort traffic on the originating or terminating side of the DDR link 112 (gateways 108 or 116). The gateways 108 and 116 know not to advertise the new DDR link 112 based on call information such as calling or called number and associated configuration. New calls may be admitted to the DDR link 112 if an admissions control protocol, such as RSVP, exists between gateways 108 and 116.

It is important that the DDR interfaces do not advertise the new DDR route 112 to the rest of IP network 114. This is because other routers #1, #2, #3 and #4 in the IP network 114 would then try to route best effort packets for communications over link 112. For example, a congestion condition 117 may cause congestion for all packets transmitted between router #1 and router #3. If the gateways 108 and 116 advertised the new DDR link 112 to the other routers #1–#4, router #1 may then start sending all packets destined for router #3 to gateway 108. Gateway 108 would then send packets over DDR link 112 to gateway 116 for forwarding to router 3. The result is that the congestion point 117 in IP network 114 may move to a congestion point 113 on DDR link 112. This eliminates the advantage for establishing DDR link 112. Thus, the routing tables for routers #1–#4 are intentionally not updated with the DDR route 112 between gateways 108 and 116.

Figure 13:
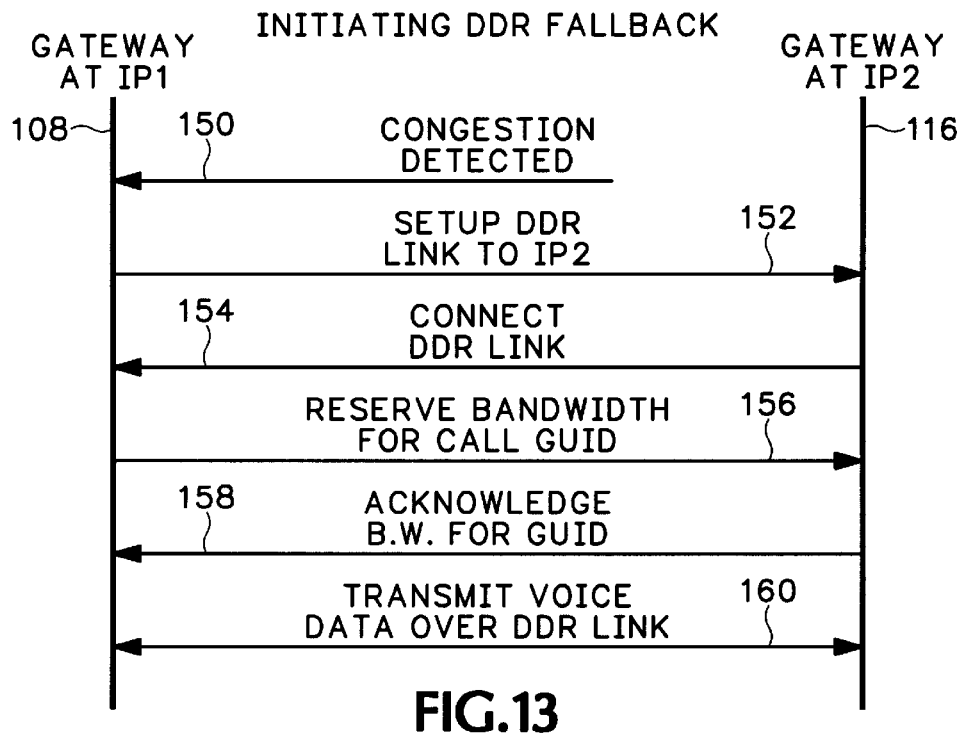
FIG. 13 is a ladder diagram showing how the DDR scheme initiates the DDR fallback link.

FIGS. 13–18 further describe how the DDR controllers 110 (FIGS. 10 and 11) initiate a DDR link, add calls to the DDR link and bleed calls from the DDR link. Referring to FIG. 13, gateway 108 has an IP address IP1 and gateway 116 has an IP address IP2. In step 150, congestion is detected on a VoIP link between devices associated with IP addresses IP1 and IP2. In step 152, a DDR link is set up to IP address IP2. This is typically a modem at IP1 phoning the network processing device at IP2. The gateway 116 accepts the DDR Link in step 154.

In step 156, bandwidth is reserved for an incoming call having a Global Unique Identifier (GUID) directed between the IP addresses IP1 and IP2. A GUID is used in call signaling standard H.323 and other call signaling protocols to globally and uniquely identify an incoming call. The GUID usually includes a Media Access Controller (MAC) address, sequence number and timestamp from some system in the end-to-end call, usually the originating gateway or endpoint in the case of VoIP.

The gateway 116 acknowledges the bandwidth reservation for the GUID in step 158. VoIP packets for any subsequent call received at gateway 108 that has the specified GUID are then redirected over the DDR link in step 160.

Bleeding Off DDR Link

Figure 14:
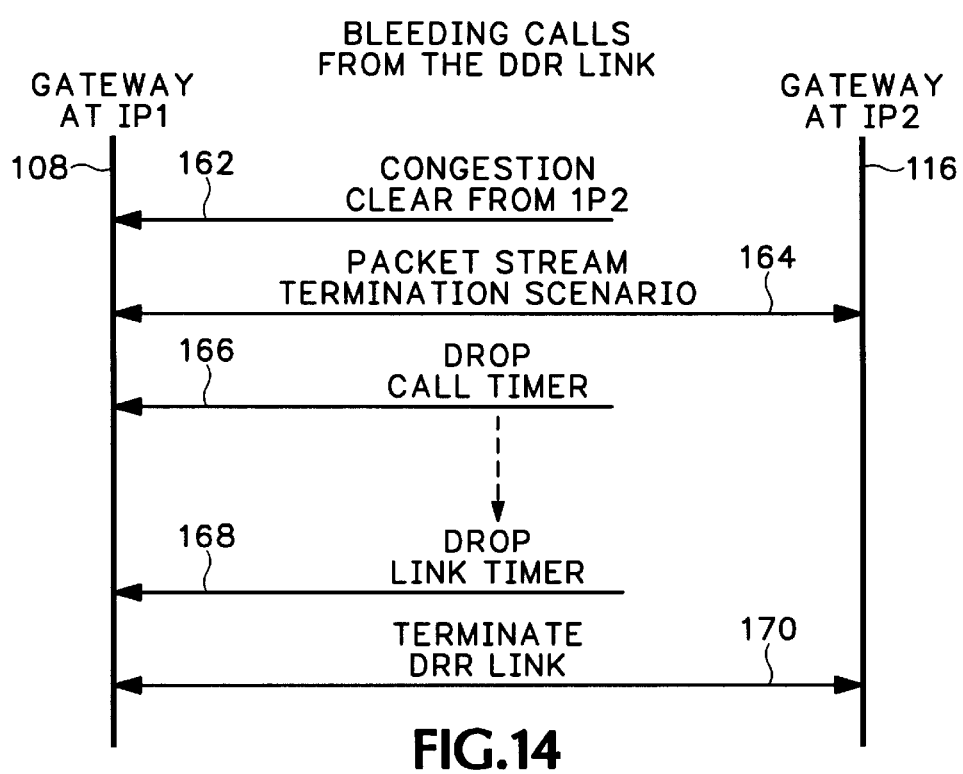
FIG. 14 is a ladder diagram showing how the DDR scheme bleeds calls from the DDR link.

FIG. 14 describes how calls are bled from the DDR link. The DDR controller in step 162 detects that congestion is clear on the VoIP link. The packet stream sent over the DDR link is terminated in step 164. Either the call associated with the packet stream is terminated by the callers altogether or the packet stream is moved back to the VoIP link. In one scenario, once a call is moved over to the DDR link, that call remains on the DDR link until the call is terminated by the callers. If new incoming calls are received having the identified GUID and the congestion condition no longer exists, those new calls are forwarded over the IP network. Thus, eventually no calls will remain on the DDR link.

Timers are used by the DDR controller to prevent constant adding and bleeding calls to the DDR link. The removal of the DDR link when idle is also delayed by some time period to avoid the need to reestablish the DDR link on the next call. It is also possible to leave the DDR link up until probing suggests that the default VoIP route is acceptable.

A drop call timer is started in step 166 after a call is dropped from the DDR link. If the congestion condition is still clear after the drop call timer has expired, the DDR terminates another call from the DDR link. After all calls have been dropped from the DDR link, a second drop link timer is initiated in step 168. If there is still no detected congestion or calls after the drop link timer has expired, the DDR link is terminated in step 170.

Figure 15:
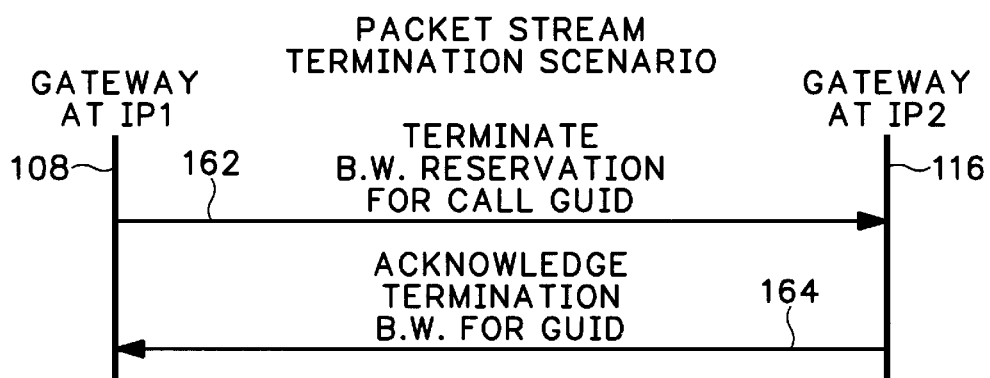
FIG. 15 is a ladder diagram showing how the DDR scheme terminates packet streams from the DDR link.

In FIG. 15, a terminate bandwidth reservation request for the identified GUID call is sent by gateway 108 to gateway 116. In step 164, gateway 116 acknowledges the termination of bandwidth reservation for the GUID call.

Figure 16:
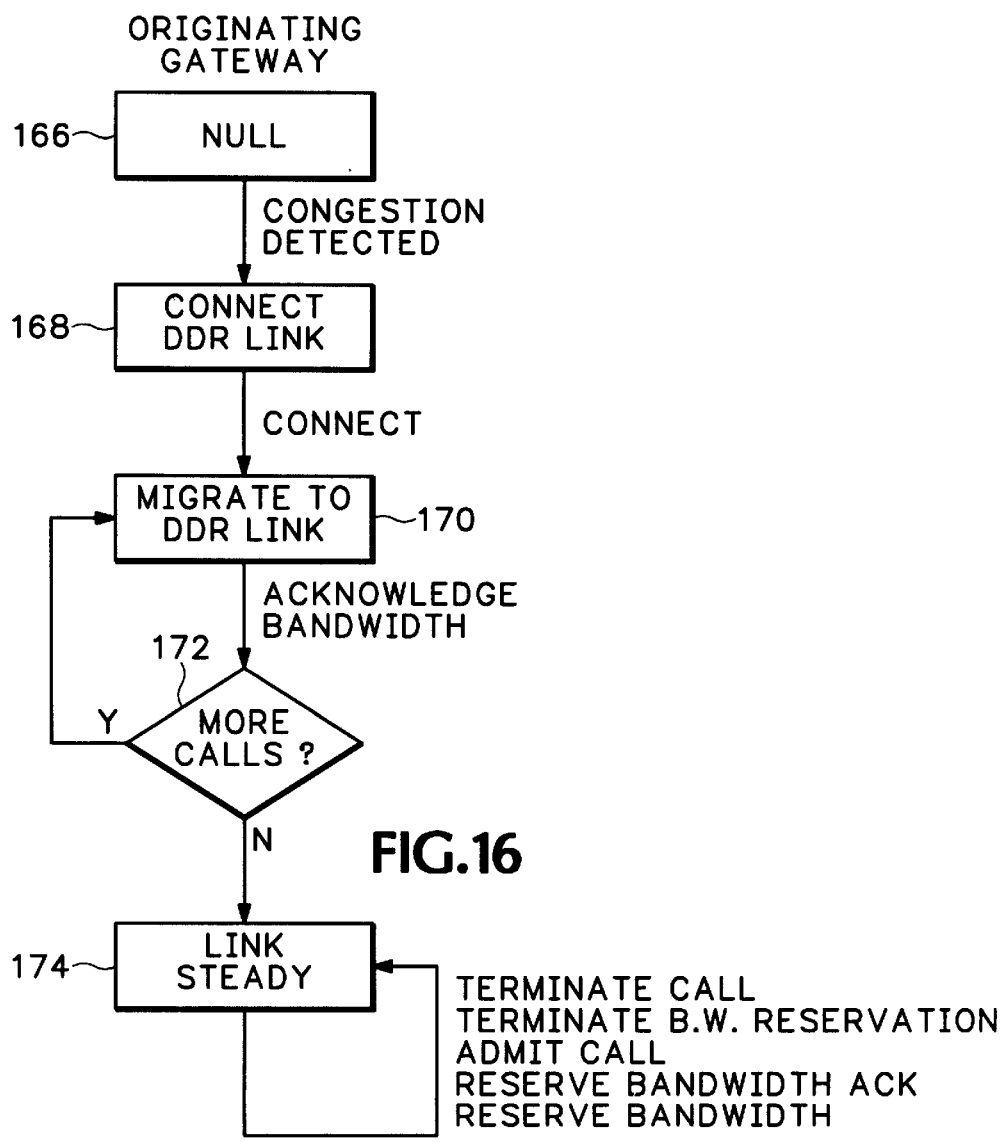
FIG. 16 is a flow diagram showing how the DDR link is established at an originating gateway.

FIG. 16 shows operation of a DDR controller state machine for the gateway originating a call over the IP network. In state 166, the DDR controller looks for an IP address identified with congestion. If a congestion condition is detected, state 168 establishes a DDR link with the processing device at the identified congested IP address. The DDR controller then migrates a call from the VoIP link to the DDR link in state 170.

The DDR controller sends a bandwidth reservation request to the termination endpoint for redirecting the call over the DDR link. If the bandwidth reservation request is acknowledged, the call is redirected to the DDR link. Decision step 172 determines if there are additional calls on the IP network directed to the congested termination endpoint. If there are additional calls and there is available bandwidth, packets for another one of those calls are migrated to the DDR link.

When there are no more calls to migrate over to the DDR link, the DDR controller moves into link steady state 174. When a call is terminated in state 174, the DDR controller terminates bandwidth reserved for that call. If a new call needs to be admitted to the DDR link, the DDR controller first ensures there is bandwidth available on the DDR link for the new call by sending a reserve bandwidth request to the DDR link termination endpoint. When a bandwidth acknowledge is received, a new call is then cleared for redirecting over the DDR link.

Figure 17:
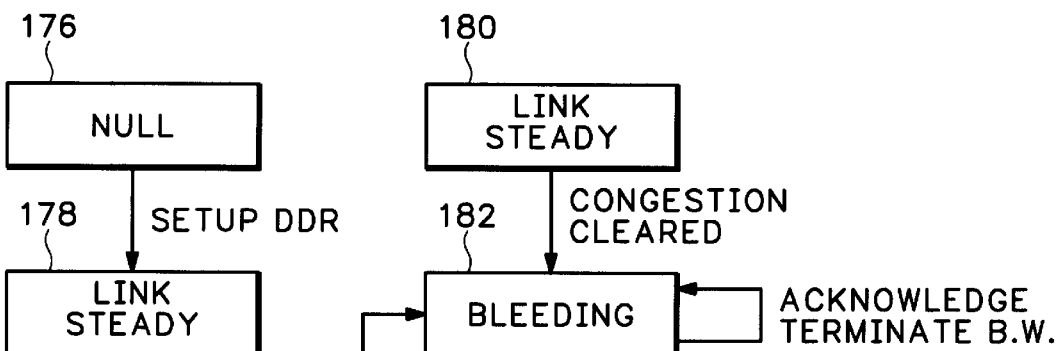
FIG. 17 is a flow diagram showing how a DDR link is set up.

FIG. 17 shows the DDR state machine at the terminating side of the DDR link. The DDR link is set up when a DDR setup request is made in state 176. The terminating DDR controller then connects to the DDR link in state 178. Once in the link steady state 178, the state machine operates the same as state 174 in the originating DDR controller shown in FIG. 16.

Figure 18:
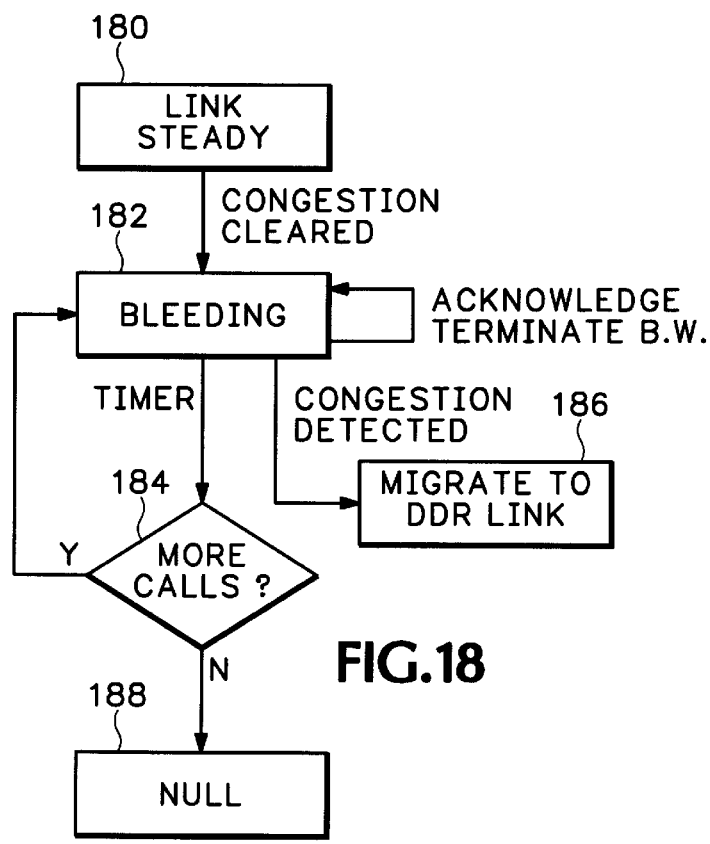
FIG. 18 is a flow diagram showing how the DDR link is terminated.

FIG. 18 is a state machine showing how calls are bled from the DDR link. If acceptable QoS is maintained for a period of time, as determined by the congestion detector described above, calls will be moved back to the default IP network. Calls will continue to be bled off the DDR link until no calls are left on the DDR link. Each additional call is bled off from the DDR link after waiting a time period designated by the drop call timer described above in FIG. 14. If network congestion is once again detected during the bleed-off state 182, calls are migrated back to the DDR link and the bleed-off timer is reset. If congestion continues to be clear and if there are no more calls on the DDR link, the DDR DDR link is terminated in null state 188.

The DDR scheme described above reduces PSTN costs since up to five calls can be routed per DDR fallback connection. Another advantage is that the "call route" remains unchanged for active calls from the perspective of call control. Therefore, complex protocols to reestablish media streams "in call" are not required. The DDR concept can be extended to any circuit switch technology, not just the PSTN, for example, Frame Relay or ATM.

The DDR controller and DDR scheme described above can be implemented in hardware such as a Programmable Logic Device (PLD). Alternatively, the DDR scheme can be implemented in software code that is loaded into a software programmable processor.

Voice Activation Detection

In another aspect of the invention, Voice Activation Detection (VAD) is used for call resynchronization. Referring briefly back to FIG. 7, with VAD the destination gateway 22 detects silence periods. When there is a silence period in the playback, the DSP in VoIP receive interface 30 signals to the cross connect switch 24 that such a condition exists. The switch 24 then makes the fallback call 65 the active channel. Similarly, when the fallback call 65 is the active channel, the DSP in interface 30 detects silence and indicates to the cross connect switch 24 to will make the packet stream in the VoIP call 63 the active channel.

The DSP in interface 30 is told by the cross connect switch 24 to monitor silence periods from the packet stream in VoIP call 63. If a silence period is detected, the cross connect switch 24 switches from the packet stream to the TDM stream or from the TDM to the packet stream depending on whether the cross connect switch is moving from the fallback call (TDM Active) or from the packet switched call. When the switchover is complete, indication is sent to a higher layer control.

This VAD cross over technique is relatively unaffected by the time lag of the packet stream with respect to the TDM stream since typical end to end delay is less than 250 milliseconds and a silence period of one speaker in a conversation is likely to extend to multiple seconds. Thus, when a speaker goes silent, the DSP detects this condition and switches to the backup call. It is unlikely that any speech from the backup call is missed since the silence period is expected to be longer than the delay on the packet network.

When switching from the TDM call back to the packet based call no speech will be missed since the packet stream in the VoIP call 63 lags the TDM stream in the fallback call 65. It is unlikely that any speech from the TDM call will arrive before silence is detected in the packet stream since the silence period is expected to be longer than the packet delay.

Figure 19:
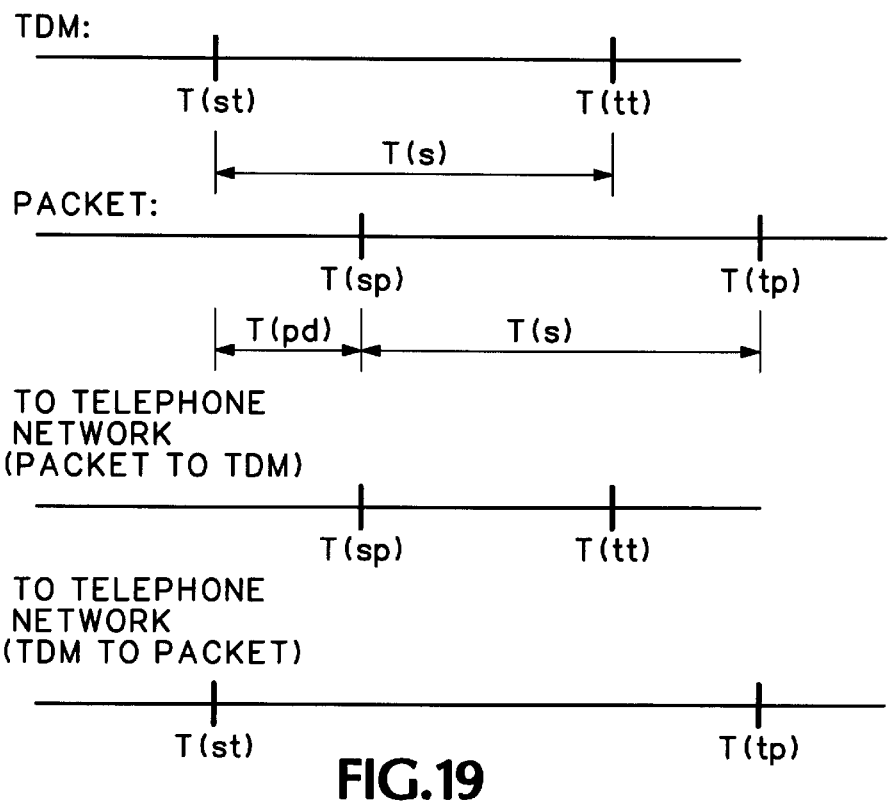
FIG. 19 is a time line showing how Voice Activation Detection is used to synchronize fallback calls.

Referring the timeline in FIG. 19, the following terms are used to explain the timing delays in fallback calls.

T(st)—Time Silence detected on TDM call.
T(tt)—Time next talk spurt detected on TDM call.
T(sp)—Time silence detected on the packet stream VoIP call.
T(tp)—Time next talk spurt detected on the packet stream.
T(pd)—End to end delay on packet stream VoIP call.
T(s)—Time of silence period.

So long as T(pd)<T(s), which is the likely case, the Telephone network will not miss any speech. The effect will be a variation from the silence duration by T(pd).

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for call fallback in a packet switched network, comprising:
   receiving incoming calls;
   establishing a Voice over IP (VoIP) link over the packet switched network with a destination endpoint;
   generating audio packets from the incoming calls and sending the audio packets over the VoIP link to the destination endpoint;
   identifying a low quality of service condition on the VoIP link;
   establishing a fallback data link to the destination endpoint over a circuit switched network when the low quality of service condition is identified;
   identifying incoming calls having a destination address associated with the destination endpoint during the poor quality of service condition;
   redirecting VoIP packets for the identified incoming calls from the VoIP link to the fallback data link;

establishing another fallback data link over the circuit switched network to a different destination endpoint when there is insufficient bandwidth on the already established fallback data link; and conducting a multilink point to point protocol session using both fallback data links established over the different destination endpoints.

2. A method according to claim 1 including:

directing the audio packets for the identified incoming calls over both the VoIP link and the fallback data link;

detecting a silence period in the VoIP link: and switching from outputting the VoIP packets from the VoIP link to outputting the VoIP packets from the fallback data link when the silence period is detected.

3. A method according to claim 1 wherein the fallback data link is a ISDN channel in a PSTN network and the audio packets are sent as a bit stream over the ISDN channel.

4. A method according to claim 1 including:

identifying the low quality of service condition;

requesting allocation of bandwidth on the fallback data link for one of the incoming calls; and redirecting packets for the incoming call to the fallback data link when bandwidth has been allocated.

5. A method according to claim 1 including:

establishing one fallback data link on a first network processing node and establishing another fallback data link on a second network processing node;

establishing the fallback data links as a multilink bundle; and conducting a multilink multichassis protocol session with the multilink bundle on the different network processing nodes by forwarding the audio packets received on the second network processing node to the first network processing node.

6. A method according to claim 1 wherein the fallback data link is not advertised to any other network processing node in the packet switched network other than the destination endpoint.

7. A method according to claim 1 including:

detecting when the low quality of service condition no longer exists on the packet switched network;

starting a drop call timer; and bleeding audio packets from one of the incoming calls from the fallback data link back to the VoIP link when the drop call timer expires.

8. A method according to claim 7 including:

repeatedly bleeding audio packets for other incoming calls from the fallback data link to the VoIP link by first waiting for the call timer to expire and then verifying that the low quality of service condition no longer exists on the VoIP link;

repeatedly bleeding audio packets for all remaining incoming calls from the fallback data link to the VoIP link as long as the low quality of service condition no longer exists on the VoIP link;

starting a drop link timer when all incoming calls have been bled from the fallback data link; and terminating the fallback data link when the drop link timer expires and the low quality of service condition no longer exists on the VoIP link.

9. A method according to claim 1 including identifying incoming calls associated with the low quality of service condition according to Global Unique Identifiers (GUIDs) in the audio packets generated from the incoming calls.

10. A method according to claim 1 wherein the low quality of service condition is detected using a RSVP, RTCP or probing protocol.

11. A VoIP gateway, comprising:

a telephony interface for receiving an incoming voice call;

a VoIP interface for encoding the incoming voice call into VoIP packets; and sending the VoIP packets over a VoIP network; and a controller that establishes a fallback call with an endpoint over a circuit switched network and then redirects the VoIP packets from the VoIP network over the fallback call;

a voice activation device that detects silence periods in the incoming voice call; and a switch that switches an active channel from outputting VoIP packets received over the VoIP network to outputting VoIP packets received over the fallback call when the silence period is detected.

12. A VoIP gateway according to claim 11 wherein the controller includes a congestion detector that monitors quality of service conditions for an IP address associated with the endpoint and redirects the VoIP packets to the fallback call when a low quality of service condition is detected by the congestion detector.

13. A VoIP gateway according to claim 12 includes a call table used by the congestion detector to monitor how many incoming voice calls are redirected to the fallback call.

14. A VoIP gateway according to claim 12 wherein the congestion detector periodically sends packet probes to the IP address and compares the packet probes with previously sent packet probes to determine the quality of service for the VoIP network.

15. A VoIP gateway according to claim 11 wherein the controller includes a Dialing on Demand Routing (DDR) interface that establishes the fallback call over an ISDN channel on the circuit switched network and redirect a bitstream representing the VoIP packets over the ISDN channel.

16. A VoIP gateway according to claim 15 including a dialer table used by the DDR interface to identify and call a phone number associated with the IP address of the endpoint.

17. A VoIP gateway according to claim 15 wherein the DDR interface establishes another fallback call to another endpoint over another ISDN channel when there is insufficient bandwidth on the existing ISDN channel for transmitting audio packets for additional incoming calls, the DDR interface then conducting a multilink session with the different endpoints where one of the endpoints forwards the audio packets from one of the established fallback calls to the other endpoint.

18. A VoIP gateway according to claim 11 including:

a drop call timer for waiting a predetermined amount of time before bleeding incoming calls from the fallback call back to the VoIP network after the low quality of service condition ends; and a drop link timer for waiting a predetermined amount of time after all calls have been bled from the fallback call before terminating the fallback call.

19. An electronic storage medium for storing software for controlling calls in a network processing device, including:

code for detecting an incoming call;

code for monitoring quality of service of a VoIP call that transmits VoIP packets containing audio for the incoming call;

code for initiating a fallback call over a circuit switched network to a destination endpoint when a low quality of service condition is detected on the VoIP call;

code for redirecting the VoIP packets from the VoIP call to the fallback call during the low quality of service condition;

code for establishing another fallback call over the circuit switched network to a different destination endpoint when there is insufficient bandwidth on the already established fallback call; and code for conducting a multilink point to point protocol session using both fallback calls established over the different destination endpoints.

20. An electronic storage medium according to claim 19 including:

code for directing the VoIP packets for the detected incoming call over both the VoIP call and the fallback call;

code for detecting a silence period in the VoIP packets; and code for switching from using the VoIP packets from the VoIP call to using the VoIP packets from the fallback call when the silence period is detected.

21. An electronic storage medium according to claim 20 wherein the return characteristics include return time and number of dropped probe packets.

22. An electronic storage medium according to claim 19 including:

code for identifying an IP address associated with a new incoming call;

code for identifying when the IP address is associated with a congested VoIP call;

code for tracking the number of calls currently redirected from the VoIP call to the fallback call; and code that redirects the new incoming call from the VoIP call to the fallback call according to the number of incoming calls currently redirected to the fallback call.

23. An electronic storage medium according to claim 19 including:

code for initiating another fallback call over the circuit switched network when there is insufficient bandwidth on the existing fallback call for handling additional incoming calls; and code for treating the multiple fallback links as a multilink point to point bundle.

24. An electronic storage medium according to claim 19 including:

code for matching an IP address associated with the low quality of service condition with a phone number in a dialer table;

code for automatically dialing up a network processing device at a phone number in the dialer table that matches the IP address; and code for establishing the fallback call with the dialed up network processing device.

25. An electronic storage medium according to claim 19 including:

code for identifying when the congestion condition ends on the VoIP call;

code for waiting a period of time after the end of the congestion condition; and code for redirecting new incoming calls to the VoIP call when the congestion condition no longer exists after the period of time.

26. An electronic storage medium according to claim 25 including:

code for bleeding off one by one the incoming calls currently on the fallback call back to the VoIP call;

code for clocking a drop call wait period after each bleed off and then reverifying that the VoIP call no longer exhibits the low quality of service condition;

code for repeatedly bleeding off the incoming calls from the fallback call back to the VoIP call until no incoming calls remain on the fallback call;

code for clocking a fallback call disconnect time period after all the incoming calls have been bled off the fallback calls; and code for disconnecting the fallback call after the fallback call disconnect time period has expired, the VoIP call no longer exhibits a low quality of service condition and no incoming calls have been reestablished on the fallback call.

27. An apparatus for controlling calls in a network processing device, including:

means for detecting incoming calls;

means for monitoring quality of service of VoIP calls that transmit VoIP packets containing audio for the incoming calls;

means for initiating a fallback call over a circuit switched network when a low quality of service condition is detected on one or more of the VoIP calls;

means for redirecting the VoIP packets from one or more of the VoIP calls to the fallback call during the low quality of service condition;

means for detecting when the low quality of service condition no longer exists on the VoIP calls;

means for starting a drop call timer;

means for bleeding VoIP packets from the incoming calls from the fallback call back to the VoIP calls when the drop call timer expires;

means for repeatedly bleeding VoIP packets for other incoming calls from the fallback call to the VoIP calls by first waiting for the call timer to expire and then verifying that the low quality of service condition no longer exists on the VoIP calls;

means for repeatedly bleeding VoIP packets for all remaining incoming calls from the fallback call to the VoIP calls as long as the low quality of service condition no longer exists on the VoIP calls;

means for starting a drop link timer when all incoming calls have been bled from the fallback call; and means for terminating the fallback call when the drop link timer expires and the low quality of service condition no longer exists on the VoIP calls.

* * * * *

UNITED STATES PATENT AND TRADEMARK OFFICE
CERTIFICATE OF CORRECTION

PATENT NO. : 6,282,192 B1
DATED : August 28, 2001
INVENTOR(S) : Murphy et al.

It is certified that error appears in the above-identified patent and that said Letters Patent is hereby corrected as shown below:

Column 1,
Line 22, "A coded uses" should read -- A codec uses --.

Column 3,
Line 50, "a coded. Packetizer" should read -- a codec. Packetizer --.

Column 4,
Line 27, "the coded employed" should read -- the codec employed --.

Column 5,
Line 13, "voice coded used." should read -- voice codec used. --.

Column 6,
Line 18, "gateway and" should read -- gateway 12 and --.

Column 9,
Line 4, "identified IPI/UDP" should read -- identified IP1/UDP --.

Signed and Sealed this

Twenty-second Day of June, 2004

JON W. DUDAS
*Acting Director of the United States Patent and Trademark Office*